US007797022B2

(12) United States Patent
Ruzicka et al.

(10) Patent No.: US 7,797,022 B2
(45) Date of Patent: Sep. 14, 2010

(54) METHOD AND APPARATUS FOR WIRELESS COMPONENTS FOR HEARING COMMUNICATION DEVICES

(75) Inventors: Terrance A. Ruzicka, Bloomington, MN (US); Thomas A. Victorian, Plymouth, MN (US); J. Virgil Bradley, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 1242 days.

(21) Appl. No.: 11/305,342

(22) Filed: Dec. 16, 2005

(65) Prior Publication Data

US 2007/0140517 A1 Jun. 21, 2007

(51) Int. Cl.
*H04B 1/38* (2006.01)
*H04M 1/00* (2006.01)

(52) U.S. Cl. ..................... 455/557; 455/41.2; 455/90.2; 455/556.1

(58) Field of Classification Search .............. 455/556.1, 455/556.2, 550.1, 3.06, 41.2, 553.1, 557, 455/569.1, 575.7, 90.1, 90.2; 381/312, 93, 381/318, 315, 328; 600/545, 301
See application file for complete search history.

(56) References Cited

U.S. PATENT DOCUMENTS 5,721,783 A * 2/1998 Anderson ................... 381/328
6,671,379 B2 * 12/2003 Nemirovski ................. 381/93
7,292,876 B2 * 11/2007 Bosch et al. ............. 455/556.1
2004/0202339 A1 10/2004 O'Brien et al.
2005/0111681 A1 5/2005 Essabar
2006/0188118 A1 * 8/2006 Berger et al. ................ 381/315

FOREIGN PATENT DOCUMENTS

WO WO-9641498 A1 12/1996

OTHER PUBLICATIONS

"European Application No. 06256385, Search Report Mailed Mar. 5, 2010", 6 pgs.

* cited by examiner

*Primary Examiner*—John Lee
(74) *Attorney, Agent, or Firm*—Schwegman, Lundberg & Woessner, P.A.

(57) ABSTRACT

A hearing communication device with wireless components is provided. One aspect of this disclosure relates to hearing communication devices, which include, but are not limited to, hearing aids and other hearing assistance devices. According to an embodiment, the device includes an enclosure and at least one microphone within the enclosure. The device also includes an amplifier, a speaker, and a signal processing circuit within the enclosure. In various embodiments, the device includes a power supply, such as a battery, electrically connected to the at least one microphone, the amplifier, the speaker and the signal processing circuit. In varying embodiments, at least one of the at least one microphone, the amplifier, the speaker and the signal processing circuit is adapted to communicate wirelessly. Other aspects and embodiments are provided herein.

36 Claims, 3 Drawing Sheets

METHOD AND APPARATUS FOR WIRELESS COMPONENTS FOR HEARING COMMUNICATION DEVICES

FIELD OF THE INVENTION

The present subject matter relates generally to hearing communication devices, and in particular to providing wireless components for hearing communication devices.

BACKGROUND

Hearing aids are electronic instruments worn in or around the ear that compensate for hearing losses by specially amplifying sound. Hearing aids use transducer and electro-mechanical components which are connected via wires to the hearing aid circuitry.

These wired connections can cause a variety of problems for a hearing aid manufacturer. Wiring connections on the small scale of hearing aids can be difficult and prone to error. Such components can also be difficult to interconnect, employing designs which yield difficulties with manufacturing and acoustic feedback. Smaller devices are subject to problems with reliability, feedback and interference.

There exist a variety of hearing communication devices besides hearing aids which exhibit many of the same problems, depending on their construction and operation.

Thus, there is a need in the art for a system of components in hearing communication devices that avoids these and other problems. The system should provide component-to-component communications, be straightforward to design and manufacture, and offer increased reliability and performance of hearing communication devices.

SUMMARY

The present system provides method and apparatus to address the foregoing needs and additional needs not stated herein. One aspect of the present system provides wireless components adapted for use in hearing communication devices. Such wireless communications include, but are not limited to, radio frequency communications, optical communications, and/or sound communications. Such communications include, but are not limited to, audio information, data information, control information, and/or programming information.

Another aspect of this disclosure includes method and apparatus having various communication options between internal components and an external controller.

Another aspect of the present disclosure includes different ways of providing power to one or more wireless internal components. In varying embodiments, power is provided individually to the components via connections. In varying embodiments, power is provided with a wireless induction method and apparatus. In varying embodiments, combinations of the foregoing provide hybrid approaches to hearing communication device design.

Programmable and highly interchangeable designs are possible by adopting the teachings provided herein. Such designs may be applied to hearing aids, including, but not limited to behind-the-ear, over-the-ear, in-the-ear, in-the-canal, and completely-in-the-canal.

Another aspect of the present system includes methods for communicating using an external controller, including, but not limited to, diagnostic information, programming information, and/or component settings. Such systems allow for setting and replacement of a variety of components, among other uses.

This Summary is an overview of some of the teachings of the present application and not intended to be an exclusive or exhaustive treatment of the present subject matter. Further details about the present subject matter are found in the detailed description and appended claims.

DETAILED DESCRIPTION

In the following detailed description, reference is made to the accompanying drawings which form a part hereof, and in which is shown by way of illustration specific embodiments in which the invention may be practiced. These embodiments are discussed in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description provides examples, and the scope of the present invention is defined by the appended claims and their equivalents.

It should be noted that references to "an", "one", or "various" embodiments in this disclosure are not necessarily to the same embodiment, and such references contemplate more than one embodiment.

The present subject matter provides a system for wireless component-to-component communications within a hearing communication device to overcome some of the problems associated with traditional wiring of components.

Figure 1:
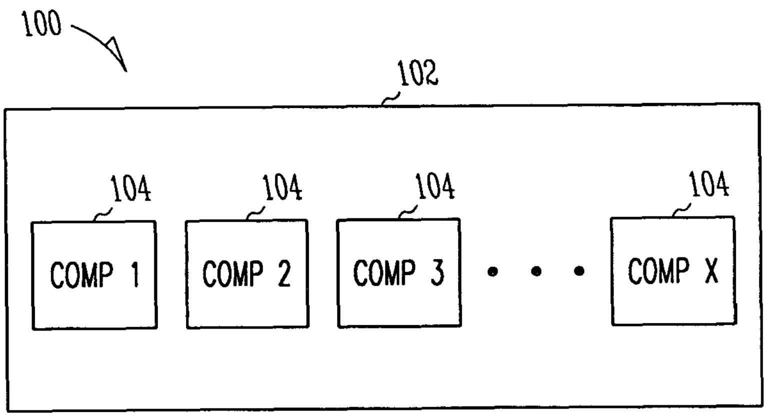
FIG. 1 is a diagram of a hearing communication device with wireless internal components, according to one embodiment of the present system.

FIG. 1 is a diagram of a hearing communication device with wireless internal components, according to one embodiment of the present system. In this example, the hearing communication device 100 can be any device having a housing or external shell 102 and multiple internal components 104. In this embodiment, at least one of the internal components 104 is adapted to wirelessly communicate with at least one other internal component 104. In various embodiments, other internal components 104 may be wired or wireless. The number of internal components 104 shown in FIG. 1 is not intended to be limiting or exclusive. Thus, designs with more components and with less components are contemplated. According to an embodiment, at least one internal component is adapted to wirelessly communicate via radio frequency signals. In one embodiment, the at least one internal component is adapted to wirelessly communicate using optics. In one embodiment, the at least one internal component is adapted to wirelessly communicate using sound. For example, one such sound is ultrasonic sound. Other wireless communications are possible without departing from the scope of the present subject matter. In various embodiments, the internal components are adapted to wirelessly communicate different forms of information, including, but not limited to, one or more of audio, data, control and/or programming information. The components utilize a variety of wireless communication protocols in various embodiments. In various embodiments, internal components are adapted to receive information. In various embodiments, internal components are adapted to transmit information. In various embodiments, internal components can transceive information. In various embodiments, internal components are highly programmable. In various embodiments, internal components are adapted to be dedicated to specific operation. Various combinations of the foregoing embodiments can be designed to create a system of different internal components. Since some embodiments are highly programmable, it is possible that these capabilities may be adjusted over the operation of the device in varying embodiments and applications.

It is contemplated that various forms of wireless component-to-component communications can take place. Thus, a variety of near field and far field telecommunications can be conducted, depending on power, and/or size, and/or radiated energy constraints. Such communications can extend to devices outside of the housing of the hearing communication device.

In varying embodiments, miniature transmitter, receiver, and transceiver configurations are possible. For wireless radio frequency applications, various forms of antennae may be employed without departing from the scope of the present disclosure. It is understood that existing and newly developed communications subsystems may be employed to transmit information between the components. In varying embodiments, integrated systems, such as motes, can be used. The present system may employ any variety of micro electromechanical systems (MEMS) in combination. Other types of hardware and software may be employed and realizations may incorporate different amounts of hardware and software without departing from the scope of the present subject matter.

Figure 2A:
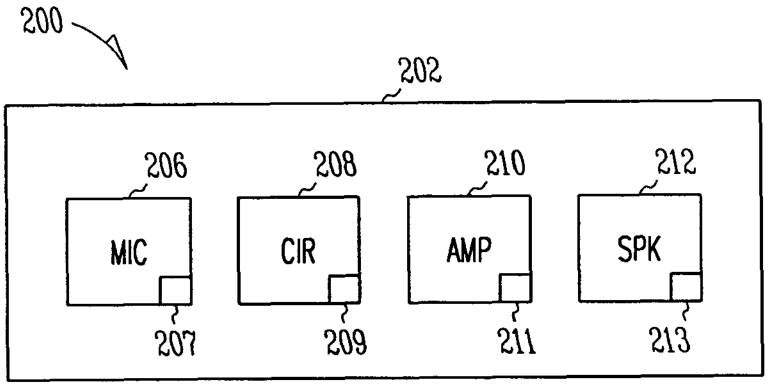
FIG. 2A is a diagram of a hearing communication device, according to one embodiment of the present system.

FIG. 2A is a diagram of a hearing communication device, according to one embodiment of the present system. The embodiment of FIG. 2A includes components which may be found in a hearing aid or other sound amplification or hearing assistance device. According to this embodiment, the apparatus 200 includes an enclosure 202 and at least one microphone 206 having an independent power supply 207 within the enclosure. The apparatus also includes an amplifier 210 having an independent power supply 211, a speaker 212 having an independent power supply 213, and a signal processing circuit 208 having an independent power supply 210 within the enclosure. In this embodiment, at least one of the at least one microphone 206, the amplifier 210, the speaker 212 and the signal processing circuit 208 is adapted to communicate wirelessly. In applications relating to hearing aids, sometimes the enclosure 202 is an earmold or shell and speaker 212 is referred to as a "receiver." The various different hearing aid designs include, but are not limited to behind-the-ear (BTE), over-the-ear (OTE), in-the-ear (ITE), in-the-canal (ITC), and completely-in-canal (CIC) configurations. Other configurations are possible without departing from the scope of the present subject matter.

In one embodiment, the microphone 206 is adapted to transmit information wirelessly. In one embodiment, the microphone 206 is adapted to receive information wirelessly. In one embodiment, the microphone 206 is adapted to transmit and receive information wirelessly. Such functionalities for transmit and receive may also be programmably controlled in various embodiments. For example, in programmable embodiments, it is possible to stop or interrupt transmissions by the microphone when the hearing communication device detects a signal indicating that a telephone is close to the apparatus 200. Such signals include near field or magnetic coupling with a telephone handset having a telephone coil or inductive pickup of the telephone signal. Other telephone signals may be detected without departing from the scope of the present subject matter, and such signals may be employed to control the communication of information from and to the microphone 206. Other applications are possible as well. For instance wireless transmissions by the microphone can be interrupted and another radio source could be used for communicating to the hearing communication device. Such transmissions may also be buffered and played at different times due to interruptions by other signals processed and/or received by the hearing communication device.

According to various embodiments, the amplifier 210 transmits information wirelessly. According to various embodiments, the amplifier 210 receives information wirelessly. According to various embodiments, the amplifier 210 transmits and receives information wirelessly. Various embodiments employ a highly programmable amplifier 210 to switch between transmission, reception, and/or transceiver modes.

According to various embodiments, the speaker 212 transmits information wirelessly. According to various embodiments, the speaker 212 receives information wirelessly. According to various embodiments, the speaker 212 transmits and receives information wirelessly. Various embodiments employ a highly programmable speaker 212 to switch between transmission, reception, and/or transceiver modes.

According to various embodiments, the signal processing circuit 208 transmits information wirelessly. According to various embodiments, the signal processing circuit 208 receives information wirelessly. According to various embodiments, the signal processing circuit 208 transmits and receives information wirelessly. Various embodiments employ a highly programmable signal processing circuit 208 to switch between transmission, reception, and/or transceiver modes.

In various embodiments, the apparatus also includes a telecoil having an independent power supply within the enclosure. The apparatus further includes a voicecoil having an independent power supply within the enclosure, according to various embodiments.

It is understood that the foregoing may be embodied in designs having a single power supply, in which the communication of information is wired or wireless in several embodiments. The foregoing may also be embodied in designs having more than one power supply and less than one power supply for each component. Thus, power supply configurations may vary without departing from the scope of the present subject matter.

Various combinations of the foregoing apparatus are possible without departing from the scope of the present subject matter.

Figure 2B:
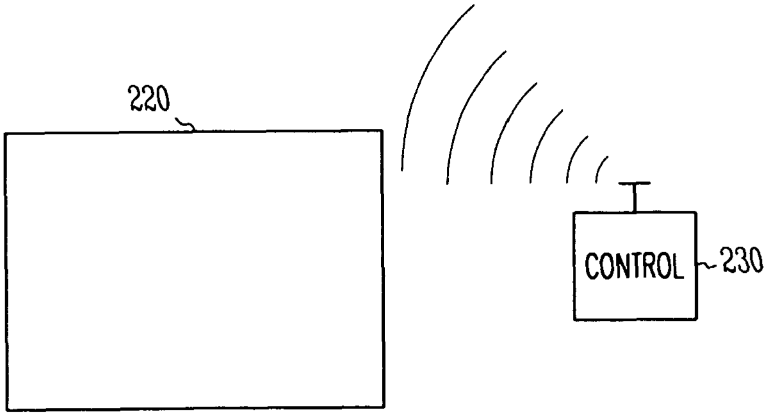
FIG. 2B is a diagram of a hearing communication device and an external controller, according to one embodiment of the present system.

FIG. 2B is a diagram of a hearing communication device 220 and an external controller 230, according to one embodiment of the present system. In this embodiment, the device 220 is adapted to wirelessly communicate with at least one external controller 230. The device 220 includes, but is not limited to, the hearing communication devices depicted in FIGS. 1, 2A, 3, 4, 5 and 6, in various embodiments, and the discussions of those devices are incorporated herein. The external controller 230 is adapted to wirelessly communicate with a signal processing circuit within the device 220, in one embodiment. In various embodiments, the device 220 receives wirelessly from the external controller 230. In various embodiments, the device 220 transmits wirelessly to the external controller 230. According to various embodiments, the device 220 transceives wirelessly with the external controller 230. Other programmable receive, transmit and transceiver modes are possible without departing from the scope of the present subject matter.

The wireless communications allow for a variety of control, diagnostic, maintenance, programming, and/or data transmission operations between the device 220 and the controller 230. Depending on how device 220 is configured, the controller 230 can communicate directly or indirectly with any component of the device 220. Such designs could yield rapid repairs and/or improvements as high modularized embodiments could have components diagnosed and changed quickly to correct a defect or provide better functionality of an device 220. Other applications are possible without departing from the scope of the present subject matter.

Figure 3:
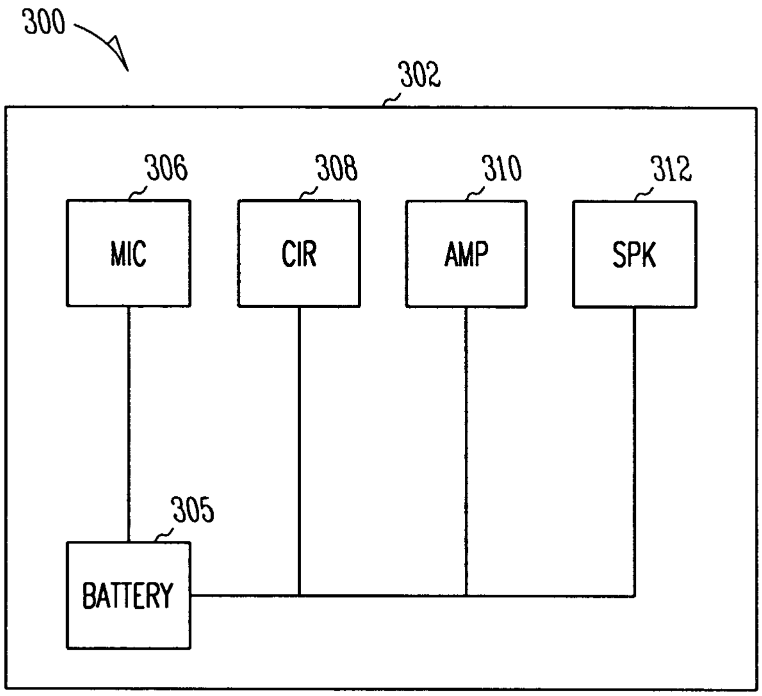
FIG. 3 is a diagram of a hearing communication device, according to one embodiment of the present system.

FIG. 3 is a diagram of a hearing communication device, according to one embodiment of the present system. According to this embodiment, the device 300 includes an enclosure 302 and at least one microphone 306 within the enclosure. The device 300 also includes an amplifier 310, a speaker 312, and a signal processing circuit 308 within the enclosure. In addition, the device 300 includes a power supply, such as battery 305, electrically connected to the at least one microphone 306, the amplifier 310, the speaker 312 and the signal processing circuit 308. In this embodiment, at least one of the at least one microphone 306, the amplifier 310, the speaker 312 and the signal processing circuit 308 is adapted to communicate wirelessly. The communication modes and options set forth in the discussion of the internal components of FIGS. 1 and 2A are incorporated herein by reference. Other embodiments are possible without departing from the scope of the present subject matter.

Figure 4:
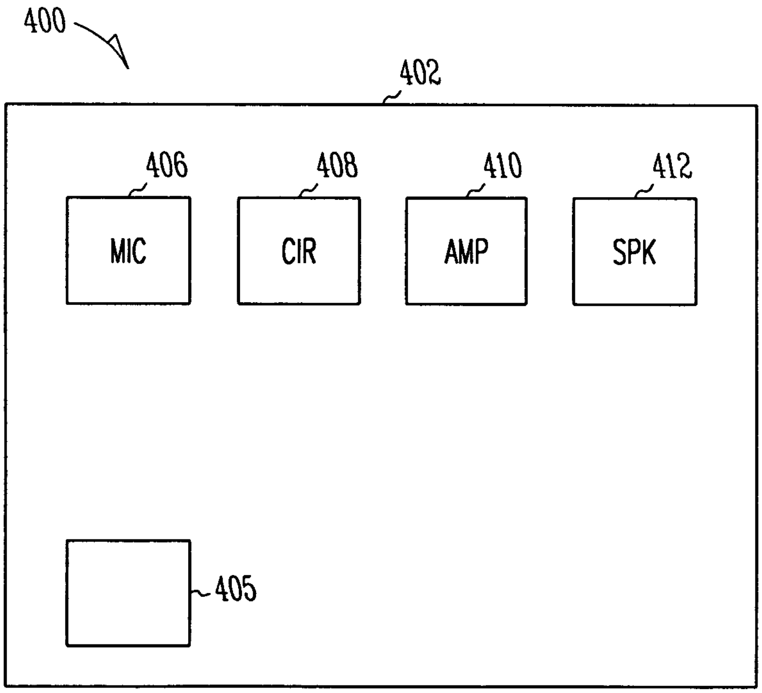
FIG. 4 is a diagram of a hearing communication device, according to one embodiment of the present system.

FIG. 4 is a diagram of a hearing communication device 400 with wireless power supply connections, according to one embodiment of the present system. According to an embodiment, the device 400 includes an enclosure 402 and at least one wireless microphone 406 within the enclosure. The apparatus also includes a wireless amplifier 410, a wireless speaker 412, and a signal processing circuit 408 within the enclosure. In addition, the device 400 includes a power supply 405 wirelessly connected to the at least one microphone 406, the amplifier 410, the speaker 412 and the signal processing circuit 408. In this embodiment, at least one of the at least one microphone 406, the amplifier 410, the speaker 412 and the signal processing circuit 408 is adapted to communicate wirelessly. The power supply 405 powers the components via an inductive or transformer coupling to the various components. The communication modes and options set forth in the discussion of the internal components of FIGS. 1 and 2A are incorporated herein by reference. Other embodiments are possible without departing from the scope of the present subject matter.

Figure 5:
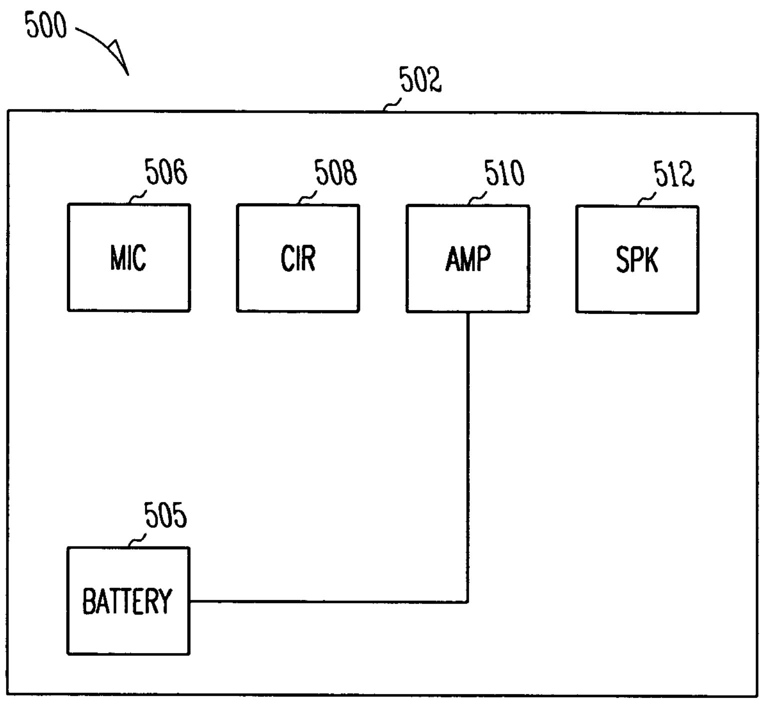
FIG. 5 is a diagram of a hearing communication device, according to one embodiment of the present system.

FIG. 5 is a diagram of an hearing communication device 500, according to one embodiment of the present system. In this embodiment, at least the amplifier 510 is connected to a power source, such as battery 505, due to its relatively large current requirements. The other components within the hearing aid enclosure 502, including the microphone 506, signal processing circuit 508, and speaker 512, may have wireless connections to a power supply and/or the battery 505, such as via an inductive circuit for example, or may have their own internal power supplies, in various embodiments. The communication modes and options set forth in the discussion of the internal components of FIGS. 1 and 2A are incorporated herein by reference. Other embodiments are possible without departing from the scope of the present subject matter.

Figure 6:
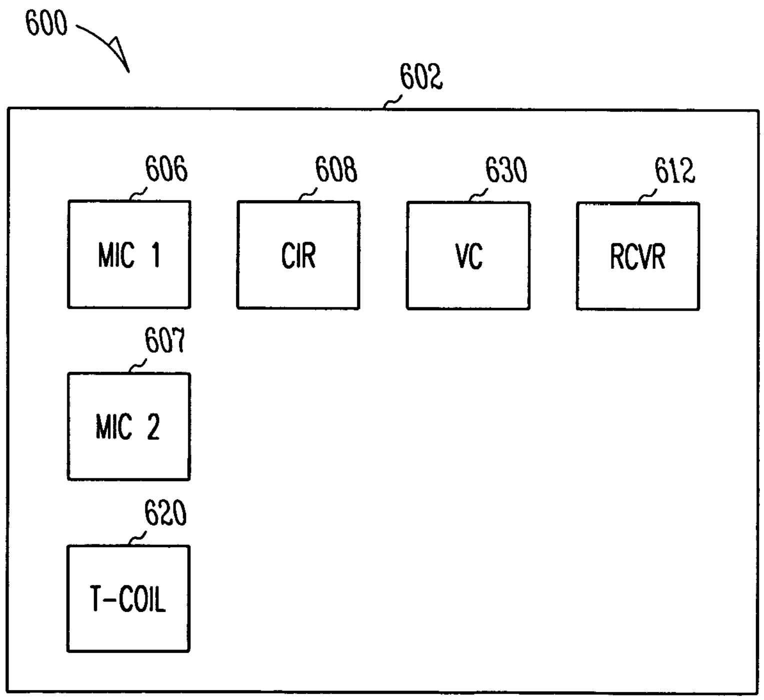
FIG. 6 is a diagram of a hearing communication device, according to one embodiment of the present system.

FIG. 6 is a diagram of a hearing communication device 600, according to one embodiment of the present system. In an embodiment, the hearing communication device 600 has, within enclosure 602, a first microphone 606, a second microphone 607, a telecoil 620, a signal processing circuit 608, a voicecoil 630 and a speaker (also called a receiver in hearing aid embodiments) 612. The internal components can be powered by any of the approaches set forth herein. One or more of the components is capable of wireless communication, according to various embodiments. The communication modes and options set forth in the discussion of the internal components of FIGS. 1 and 2A are incorporated herein by reference. Other embodiments are possible without departing from the scope of the present subject matter.

It is understood that the combination of components used in the examples herein are intended to demonstrate some aspects of the present subject matter. Variations in numbers of components, their placement, additional components, and omissions of certain components are possible without departing from the scope of the present subject matter. It is understood that a variety of hearing communication devices may benefit from all or part of the teachings provided herein. For example, a hearing communication device without a microphone may receive wirelessly sound information to be transmitted to the ear of a user. Such a system may have wireless component-to-component communications and may also support wireless communications from an external wireless audio source to the device itself. Such a system may employ a number of existing communications protocols adapted for wireless communications already known. Other variations exist without departing from the scope of the present subject matter.

Although the present system is discussed in terms of hearing communication devices generally, it is understood that many other applications in hearing aids and other hearing communication devices and audio devices, are possible. It is to be understood that the above description is intended to be illustrative, and not restrictive. Other embodiments will be apparent to those of skill in the art upon reviewing and understanding the above description. The scope of the invention should, therefore, be determined with reference to the appended claims, along with the full scope of equivalents to which such claims are entitled.

What is claimed is:

1. A hearing communication device, comprising:

an enclosure; and a plurality of internal components within the enclosure, wherein a first internal component of the plurality of internal components includes a wireless receiver, and a second internal component of the plurality of internal components includes a wireless transmitter, the wireless receiver and wireless transmitter adapted to wirelessly communicate information from the second internal component to the first internal component.

2. The hearing communication device of claim 1, wherein the wireless receiver and wireless transmitter are adapted to wirelessly communicate via radio frequency signals.

3. The hearing communication device of claim 1, wherein the wireless receiver and wireless transmitter are adapted to wirelessly communicate via optics.

4. The hearing communication device of claim 1, wherein the wireless receiver and wireless transmitter are adapted to wirelessly communicate via sound signals.

5. The hearing communication device of claim 1, wherein the second internal component is adapted to wirelessly communicate audio information.

6. The hearing communication device of claim 1, wherein the second internal component is adapted to wirelessly communicate data information.

7. The hearing communication device of claim 1, wherein the second internal component is adapted to wirelessly communicate control information.

8. The hearing communication device of claim 1, wherein the at least one internal component is adapted to wirelessly communicate programming information.

9. The hearing communication device of claim 1, wherein each of the plurality of internal components includes a power supply.

10. The hearing communication device of claim 1, wherein each of the plurality of internal components is connected to a common power supply.

11. The hearing communication device of claim 1, wherein at least one of the plurality of internal components is connected to a power supply.

12. The hearing communication device of claim 1, wherein at least one of the plurality of internal components is inductively coupled to a power supply.

13. The hearing communication device of claim 1, wherein the plurality of internal components includes a microphone, a signal processing circuit, an amplifier, and a speaker.

14. The hearing communication device of claim 13, wherein all of the internal components communicate information wirelessly one or more other internal components.

15. The hearing communication device of claim 1, wherein the hearing communication device is adapted to communicate with an external controller.

16. The hearing communication device of claim 1, wherein the hearing communication device is a behind-the-ear hearing communication device.

17. The hearing communication device of claim 1, wherein the hearing communication device is an over-the-ear hearing communication device.

18. The hearing communication device of claim 1, wherein the hearing communication device is an in-the-ear hearing communication device.

19. The hearing communication device of claim 1, wherein the hearing communication device is an in-the-canal hearing communication device.

20. The hearing communication device of claim 1, wherein the hearing communication device is a completely-in-the-canal hearing communication device.

21. The hearing communication device of claim 1, further comprising:

a telecoil within the enclosure.

22. The hearing communication device of claim 1, further comprising:

a voicecoil within the enclosure.

23. A hearing communication device, comprising:

an enclosure;

at least one wireless microphone within the enclosure;

an amplifier within the enclosure;

a speaker within the enclosure;

a signal processing circuit within the enclosure; and a power supply within the enclosure, the power supply wirelessly connected to the at least one microphone, the amplifier, the speaker and the signal processing circuit, wherein at least one of the at least one microphone, the amplifier, the speaker and the signal processing circuit is adapted to communicate information wirelessly.

24. The hearing communication device of claim 23, wherein an external audio controller is adapted to wirelessly communicate with the hearing communication device.

25. The hearing communication device of claim 23, wherein the at least one microphone, the amplifier, the speaker and the signal processing circuit have antennae.

26. The hearing communication device of claim 23, wherein the hearing communication device is a behind-the-ear hearing communication device.

27. The hearing communication device of claim 23, wherein the hearing communication device is an over-the-ear hearing communication device.

28. The hearing communication device of claim 23, wherein the hearing communication device is an in-the-ear hearing communication device.

29. The hearing communication device of claim 23, wherein the hearing communication device is an in-the-canal hearing communication device.

30. The hearing communication device of claim 23, wherein the hearing communication device is a completely-in-the-canal hearing communication device.

31. The hearing communication device of claim 23, wherein the at least one microphone, the amplifier, the speaker and the signal processing circuit are adapted to wirelessly communicate via radio frequency signals.

32. A method of communicating with a hearing communication device, comprising:

using an external controller to selectively establish communications with one or more of a plurality of internal components of the hearing communication device, each of the internal components within an enclosure adapted for wireless component-to-component communications; and communicating with one or more of the plurality of internal components.

33. The method of claim 32, wherein the communicating includes communicating diagnostic information.

34. The method of claim 32, wherein the communicating includes programming one or more internal components of the hearing communication device.

35. The method of claim 32, further comprising changing component settings based on the communications.

36. The method of claim 32, further comprising changing components based on the communications.

* * * * *